United States Patent
Boyer

(10) Patent No.: US 10,620,646 B2
(45) Date of Patent: Apr. 14, 2020

(54) METHOD FOR MANAGING THE ELECTRICAL CONSUMPTION OF A DEVICE INSTALLED ON BOARD A VEHICLE AND CONNECTED TO A BATTERY

(71) Applicants: Continental Automotive France, Toulouse (FR); Continental Automotive GmbH, Hannover (DE)

(72) Inventor: Jean-Philippe Boyer, Le Chesnay (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 16/484,207

(22) PCT Filed: Mar. 15, 2018

(86) PCT No.: PCT/FR2018/050623
§ 371 (c)(1),
(2) Date: Aug. 7, 2019

(87) PCT Pub. No.: WO2018/172667
PCT Pub. Date: Sep. 27, 2018

(65) Prior Publication Data
US 2020/0026317 A1    Jan. 23, 2020

(30) Foreign Application Priority Data

Mar. 20, 2017 (FR) .................................. 17 52248

(51) Int. Cl.
*B60R 16/03* (2006.01)
*H02J 7/00* (2006.01)
*G05F 1/10* (2006.01)

(52) U.S. Cl.
CPC .............. *G05F 1/10* (2013.01); *B60R 16/03* (2013.01); *H02J 7/0047* (2013.01);
(Continued)

(58) Field of Classification Search
CPC ...................................................... B60R 16/03
(Continued)

(56) References Cited

U.S. PATENT DOCUMENTS

| 8,533,509 B2 * | 9/2013 | Kamijima | H01M 10/482 |
| | | | 713/320 |
| 2007/0188964 A1 | 8/2007 | Yamaguchi | |

(Continued)

OTHER PUBLICATIONS

International Search Report and Written Opinion for International Application No. PCT/FR2018/050623, dated Jun. 4, 2018—8 pages.
(Continued)

*Primary Examiner* — Edward Tso
*Assistant Examiner* — Ahmed H Omar
(74) *Attorney, Agent, or Firm* — RatnerPrestia

(57) ABSTRACT

A method for managing the electrical consumption of an on-board device in a vehicle including an electric power supply battery, the device having a virtual battery, corresponding to a maximum energy quota available to keep the device active, the method includes determining a level of charge of the virtual battery depending on the level of charge of the electric power supply battery, and, in a discharge situation of the electric power supply battery: determining a probable duration of the discharge situation, calculating a score for the benefit of keeping the device active depending on at least one parameter of the vehicle and/or of the user, and, determining an instruction to keep the device active or to stop the device depending on the score and on the probable duration of the discharge situation, and stopping the on-board device if the stop instruction is determined.

8 Claims, 1 Drawing Sheet

(52) U.S. Cl.
CPC ........... *H02J 7/0063* (2013.01); *H02J 7/0048* (2020.01); *H02J 7/0049* (2020.01); *H02J 2007/0067* (2013.01)

(58) Field of Classification Search
USPC ........................................................ 320/132
See application file for complete search history.

(56) References Cited

U.S. PATENT DOCUMENTS

2007/0194748 A1    8/2007  Yamaguchi
2010/0253289 A1*  10/2010  Amir ................... H02J 7/0063
                                                              320/135

OTHER PUBLICATIONS

English Translation of Written Opinion for International Application No. PCT/FR2018/050623, dated Jun. 4, 2018, 6 pages.

* cited by examiner

METHOD FOR MANAGING THE ELECTRICAL CONSUMPTION OF A DEVICE INSTALLED ON BOARD A VEHICLE AND CONNECTED TO A BATTERY

CROSS REFERENCE TO RELATED APPLICATIONS

This application is the U.S. National Phase Application of PCT International Application No. PCT/FR2018/050623, filed Mar. 15, 2018, which claims priority to French Patent Application No. 1752248, filed Mar. 20, 2017, the contents of such applications being incorporated by reference herein.

FIELD OF THE INVENTION

The invention relates to the field of on-board electrical devices, in particular in motor vehicles.

More precisely, the present invention proposes a method for optimizing the management of the electrical consumption of an on-board electrical device, supplied with power by the battery of a vehicle, for the purpose of achieving the best compromise between keeping said device active (in standby or in operation) or completely stopping said device when the electric power supply battery of the vehicle is in a discharge situation (in particular when the engine is stopped), in order to dispense, as often as possible, with a long reboot time and to guarantee controlled electrical consumption.

BACKGROUND OF THE INVENTION

Nowadays, in particular in the context of motor vehicles, on-board electrical devices are controlled via a computer providing hardware resources that are designed, in terms of memory capacity and computational power, to execute and to make available to the user, via a human-machine interface, an increasingly high number of functions.

Specifically, modern vehicles often include a multimedia system, a satellite navigation system, a device for monitoring state parameters of the vehicle, etc. These devices are driven via a centralized human-machine interface.

Although the hardware resources integrated into the computer controlling all of these systems regularly improve and therefore make it possible to perform calculations more quickly, the fact remains that the overall boot time of such a computer is increasing.

In general, the multimedia system, with its display screen, is designed so as to be open in order to be able to interface with third-party applications for the purpose of making available to the user, via its display screen, a set of functions provided by a plurality of devices on board the vehicle or that are remote, extending well beyond just multimedia functions of the vehicle.

Nowadays, on-board multimedia systems in vehicles therefore have to allow access and control of an increasing number of functions.

The increasing number of functions to be performed and the necessary development of these functions on open development platforms have had a very negative impact on the boot time of multimedia systems, which is not offset in a satisfactory manner by the increase in power of the hardware resources that are implemented.

Therefore, the effective availability of all of the functions after booting may nowadays require several minutes. The inconvenience caused to users is therefore significant.

To limit this inconvenience, the known solutions are mainly of two types. A first solution involves adapting a technique commonly implemented in "smartphone" mobile communication terminals: this involves never stopping the functions, using a battery to keep them in a low-consumption "standby" operating mode, such that said functions are immediately available for effective use if called upon.

However, this solution exhibits two major drawbacks. First of all, the standby mode, even though it is designed to consume little energy, still consumes energy. Keeping numerous on-board functions in a vehicle in standby, consuming either directly from the battery of the vehicle or from a dedicated specific battery intended to be easily rechargeable, leads in the first case to a reduction in its operating life, the battery of the vehicle having to remain sufficiently charged to guarantee restarting of the vehicle, and in the second case to an excess cost linked to the addition of a dedicated battery.

Secondly, such a low-consumption standby mode is not automatically provided during the development of the functions of the on-board devices in a vehicle. In particular, if the problem with the boot time of the system arises only after the device is launched, for example because numerous third-party applications have been added thereto, the user will not have any means to rectify the inconvenience generated by the long boot time of the system.

In the remainder of the description, reference is made to devices or to functions that are "stopped", "in standby", or "in operation".

"Stopped" is understood to mean that no function of the device is available and making them available requires full booting of the device.

"In standby" is understood to mean that, as seen by the user, the functions of the device are not available, but making them available does not require booting of the device, because this is actually already booted.

"In operation" is understood to mean that the functions of the device are immediately available.

A second solution known to those skilled in the art involves masking the long boot time of the system by endeavoring to make the functions likely to be used first of all by the user always available as a priority. With the increase in the number of functions integrated into the system and the great diversity of users, such a mechanism is however very difficult to implement and often ineffective.

SUMMARY OF THE INVENTION

There is therefore a need for a method for the optimized management of energy-consuming functions, in particular during periods of discharge of the electric power supply battery of the vehicle (generally corresponding to periods of stoppage of the engine). An aim of an aspect of the present invention is therefore to reconcile keeping certain devices active during periods of discharge of the electric power supply battery of the vehicle, so as to avoid the penalty linked to the reboot time, in a manner adapted to the constraints of controlled use of the level of charge of the battery of the vehicle supplying power to said devices.

The method according to an aspect of the invention therefore aims to keep a device active only when this ultimately provides added value to the user.

Thus, more precisely, one subject of an aspect of the invention is a method for managing the electrical consumption of an on-board device in a vehicle comprising an electric power supply battery supplying power to said on-board device, said electric power supply battery having a discharging state and a charging state, in particular depending on the stopped or started state of the engine, said on-board device having a virtual battery, corresponding to a maximum energy quota available to keep said on-board device supplied with power by the electric power supply battery active, that is to say in standby or in operation, the electric power supply battery discharging, the method comprising determining a level of charge of the virtual battery depending on the level of charge of the electric power supply battery, and, in a discharge situation of the electric power supply battery:

determining a probable duration of said discharge situation of the electric power supply battery, calculating a score for the benefit of keeping the on-board device active depending on at least one parameter of the vehicle and/or of the user, and, determining an instruction to keep said on-board device active or to stop said on-board device depending on said score and on the probable duration of the discharge situation of the electric power supply battery, stopping the on-board device if the stop instruction is determined.

By virtue of the method according to an aspect of the invention, an electrical device consuming energy supplied by the electric power supply battery of the vehicle, in a discharge situation of said battery, is kept active only when it has been determined that the ratio between the benefit for the user (in particular the elimination of the boot time of the device) and the cost (namely the electrical energy consumption) is favorable thereto.

According to one embodiment, the method according to an aspect of the invention comprises a preliminary step of assigning the virtual battery to said on-board device.

According to one preferred embodiment, calculating the score for the benefit of keeping the on-board device active comprises determining an available usage time of the on-board device, the electric power supply battery discharging, depending on the level of charge of the virtual battery.

According to one embodiment, said one parameter of the vehicle and/or of the user is the geographical position of the vehicle.

According to one embodiment, said on-board device is a satellite navigation system.

According to one embodiment, calculating the score for the benefit of keeping the on-board device active comprises a sub-step of estimating the inconvenience caused to the user at the next booting of said on-board device, depending on the time to be waited for said on-board device to be available to said user.

According to one embodiment, said virtual battery corresponds to a predefined number of ampere-hours.

An aspect of the present invention furthermore relates to a multimedia system comprising a human-machine interface, said multimedia system being connected to an on-board device and said multimedia system comprising hardware resources designed to implement the method such as described briefly above.

An aspect of the invention also targets a motor vehicle comprising a multimedia system such as described briefly above.

BRIEF DESCRIPTION OF THE DRAWINGS

Other features and advantages of aspects of the invention will emerge during the following description, given with reference to the appended figures, which are given by way of nonlimiting example and in which identical references are given to similar objects.

DETAILED DESCRIPTION OF THE PREFERRED EMBODIMENTS

Figure 1:
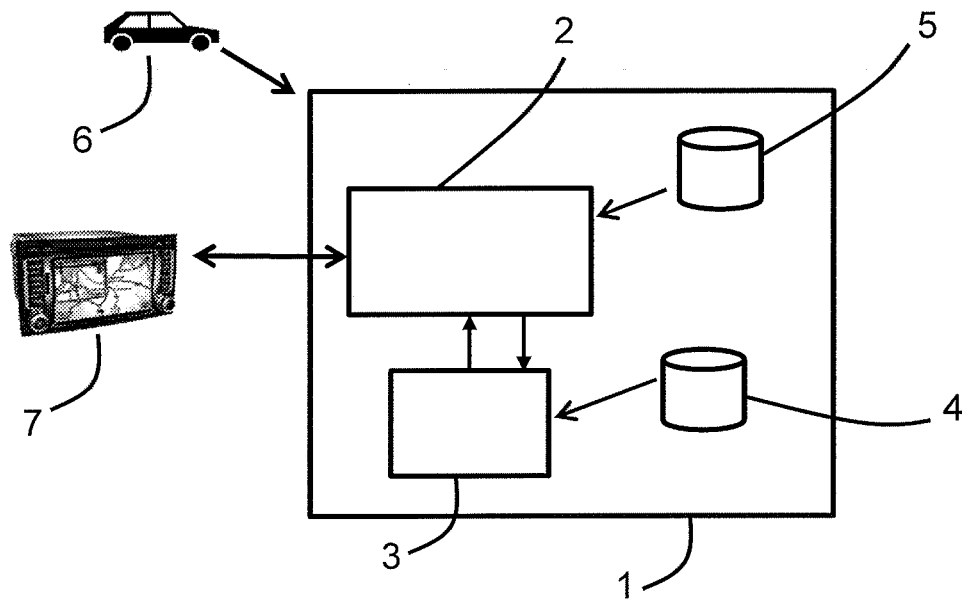
FIG. 1 illustrates a basic diagram of the operation of an on-board device driven via the human-machine interface of a multimedia system and connected to the electric power supply battery, in a vehicle.

An aspect of the invention is intended mainly for the purpose of implementation of the method for the optimized management of the electrical consumption of an on-board device via the human-machine interface of an on-board multimedia system in a motor vehicle. However, other applications, in particular the implementation of the method according to the invention in any type of vehicle in which peripheral devices are likely to consume energy from a battery, are also targeted.

As described above, an aspect of the present invention aims to optimally manage the making available of functions or devices to the user, quickly, by way of the use of a standby mode or of a mode for maintaining normal operation, in particular during periods of discharge of the electric power supply battery of the vehicle. For a given time, the associated on-board device is thus functional, without prejudice to the boot time for the functions associated with the device and without prejudice to the electric power supply battery of the vehicle being able to allow restarting of the engine.

"Optimum management" is understood in particular to mean an arbitration at the end of which the method according to an aspect of the invention makes it possible to determine whether a function/a device should be kept powered—put in standby mode or kept in operation—or by contrast stopped, depending on the benefit for the user of being able to access said function/said device without a delay and on the probability of said user effectively accessing it during an estimated duration of the discharge period of the electric power supply battery, and taking into account the electrical consumption of said device.

To define the rules of this arbitration, several principles are stipulated:

the method according to an aspect of the invention should make it possible to abstain from maintaining a function if it is ultimately shut down in order to preserve the electric power supply battery of the vehicle;

the method according to an aspect of the invention should make it possible to abstain from maintaining a function if there is no prejudice, for the user, to being subject to the boot time in the light of the context;

the method according to an aspect of the invention should advocate maintaining a function only if its electrical consumption does not put the integrity of the entire system in danger.

The solution therefore involves determining, probabilistically, the duration of each discharge period of the electric power supply battery, involving the energy consumption of said electric power supply battery when this is not (re) charging.

Depending on the probable duration of the discharge period of the electric power supply battery, the method according to an aspect of the invention estimates the benefit and the relevance of maintaining a particular function for the user.

In practice, according to an aspect of the invention, each device is associated with a virtual battery corresponding to an energy quota, in ampere-hours, that is to say a fraction of the energy available from the electric power supply battery of the vehicle. The method according to an aspect of the invention comprises evaluating a level of charge of each virtual battery depending on the level of charge of the electric power supply battery of the vehicle.

The aim is to allow discharging of the virtual battery of a device only when there is actually added value for the user, said added value corresponding to the possibility, for the user, of using the corresponding device, or to making a device available without a long boot time, when the electric power supply battery, therefore like the virtual battery, is not charging.

With reference to FIG. 1, an aspect of the present invention involves implementing an expert system 2 able to manage the electrical consumption of an on-board device 1, connected to the battery of the vehicle 6 under consideration, said expert system 2 comprising means for managing a virtual battery 3 assigned to said device 1, depending on a set of rules 4, 5 relating respectively to the charging and the discharging of said virtual battery 3 and to the environment of the expert system 2, namely for example the state of the vehicle 6, its position, the date and the time, the last functions used, etc.

According to one preferred embodiment, said expert system 2 is intended to have an interface both with the rest of the vehicle 6 and with the multimedia system 7 of the vehicle 6, said multimedia system 7 having a display screen providing the centralized human-machine interface function allowing a set of devices, including the on-board device 1 under consideration, to be controlled.

The expert system 2, in the context of an aspect of the present invention, has the role of determining an instruction to keep the on-board device 1 active or to stop the on-board device 1 when the electric power supply battery, and therefore the virtual battery 3 of said on-board device 1, is in a discharge situation.

It should be noted that the expression "keep" the on-board device 1 "active" is understood necessarily to mean keeping said on-board device 1 powered, but also either keeping it in a "standby" operating mode, corresponding to a state in which a plurality of functions of said device are temporarily stopped for the purpose of minimizing its electrical consumption, or keeping it "in operation", in the sense that all or at least most of the functions of said device are active.

Figure 2:
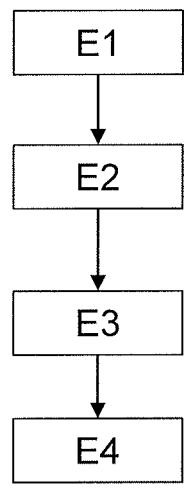
FIG. 2 illustrates a block diagram showing the steps of the method for the optimized management of the electrical consumption of such an on-board device, according to an aspect of the invention.

With reference to FIG. 2, the method for managing the electrical consumption of an on-board device 1 in a vehicle 6, connected to the electric power supply battery of said vehicle 6, comprises, according to an aspect of the invention, the following steps preferably implemented by an expert system 2 such as described above.

Said on-board device 1 is assigned beforehand a virtual battery 3, corresponding to an electrical energy quota that it is likely to be able to consume, at most, from the electric power supply battery of the vehicle 6. According to one embodiment, the virtual battery 3 corresponds to a predefined number of ampere-hours.

The method according to an aspect of the invention then includes a step E1 of managing the charging and the discharging of said virtual battery 3, depending on information on the state of the vehicle 6. In particular, if the engine is started or if the vehicle 6 is connected to an electrical recharging terminal, the virtual battery 3 is charging. On the other hand, with the engine stopped, if the on-board device 1 is active, its virtual battery 3 is discharging.

Depending on the level of charge of the virtual battery 3, and optionally on information on the state of the vehicle 6, the method according to an aspect of the invention comprises a step E2 of estimating the probable duration of a possible discharge period of said electric power supply battery, and therefore of the virtual battery 3. Said information on the state of the vehicle 6 consists of one or more of the following items of information: the time, the geographical position, the fuel level, the history of the stoppages of the vehicle 6, the fact that navigation assistance is or is not currently being used, the identity of the current user of the vehicle 6, the duration of the intended journey, etc. According to one embodiment, using a set of rules, for example based on fuzzy logic, the expert system 2 determines, in addition to the probable duration, a level of confidence in this estimation.

If the virtual battery 3 of the on-board electrical device 1 under consideration is discharging, the method according to an aspect of the invention includes a step E3 of determining a score associated with the benefit of keeping said on-board device 1 active. Calculating the score takes into account at least one parameter linked to the vehicle 6 or to the user. In particular, the determined score preferably depends on an estimation of the inconvenience caused to the user in the event of rebooting the on-board device 1.

The method according to an aspect of the invention then comprises determining (step E4) an instruction to stop said on-board electrical device 1 or to keep said on-board electrical device 1 active depending on the level of charge of said virtual battery 3, on the probable duration of the discharge period and on the score determined in the previous step (step E3).

If the calculated score is higher than a predetermined threshold, the instruction will be to keep the on-board device 1 active if the level of charge of the virtual battery 3 of the on-board device 1 and the probable duration of the discharge period of the electric power supply battery of the vehicle allow this.

If not, the instruction will be to stop the on-board device 1.

According to one embodiment, to determine the instruction to stop said on-board electrical device 1 or to keep said on-board electrical device 1 active, the method according to an aspect of the invention makes provision to take into account a level of inconvenience to the user if the system were actually to be shut down. According to one embodiment, the expert system 2 estimates the inconvenience to the user, by learning, depending on the waiting time generated during the subsequent booting before the function desired by the user is obtained.

To calculate the probable duration, the level of confidence in this probable duration estimation, and the estimation of the inconvenience caused to the user in the event of rebooting, the method according to an aspect of the invention, according to one embodiment, takes into account one or more predefined rules dependent on the on-board electrical device 1 under consideration.

According to one advanced embodiment, the expert system 2 operates by learning and therefore comprises means for dynamically updating the set of rules implemented to calculate in particular the probable duration.

According to another embodiment, the expert system 2 moreover measures the evolution of the boot times over time and takes this information into account in order to refine in particular the estimation of the level of inconvenience to the user in the scenario where the called-upon on-board device 1 were to be (re)started.

It is clarified furthermore that aspects of the present invention are not limited to the examples described above, and is open to variants that are accessible to those skilled in the art.

The invention claimed is:

1. A method for managing the electrical consumption of an on-board device in a vehicle comprising an electric power supply battery supplying power to said on-board device having a virtual battery, corresponding to a maximum energy quota available to keep said on-board device supplied with power by the electric power supply battery active, that is to say in standby or in operation, the electric power supply battery discharging, the method comprising:
   assigning the virtual battery to said on-board device,
   determining a level of charge of the virtual battery depending on the level of charge of the electric power supply battery,
   determining a probable duration of said discharge situation of the electric power supply battery,
   calculating a score for the benefit of keeping the on-board device active depending on at least one parameter of the vehicle and/or of the user, and,
   determining an instruction to keep said on-board device active or to stop said on-board device depending on said score and on the probable duration of the discharge situation of the electric power supply battery, and
   stopping the on-board device if the stop instruction is determined, wherein calculating the score for the benefit of keeping the on-board device active comprises determining an available usage time of the on-board device, the electric power supply battery discharging, depending on the level of charge of the virtual battery.

2. The method as claimed in claim 1, wherein said one parameter of the vehicle and/or of the user is the geographical position of the vehicle.

3. The method as claimed in claim 2, wherein said on-board device is a satellite navigation system.

4. The method as claimed in claim 1, wherein calculating the score for the benefit of keeping the on-board device active comprises estimating the inconvenience caused to the user at the next booting of said on-board device, depending on the time to be waited for said on-board device to be available to said user.

5. The method as claimed in claim 1, wherein said virtual battery corresponds to a predefined number of ampere-hours.

6. A multimedia system comprising a human-machine interface, said multimedia system being connected to an on-board device and said multimedia system comprising hardware resources designed to implement the method as claimed in claim 1.

7. A motor vehicle comprising a multimedia system as claimed in claim 6.

8. The method as claimed in claim 1, wherein said on-board device is a satellite navigation system.

\* \* \* \* \*